United States Patent [19]

Hara et al.

[11] Patent Number: 4,673,314

[45] Date of Patent: Jun. 16, 1987

[54] BUCKLING FENDER

[75] Inventors: Yoshiaki Hara, Hadano; Masashi Wakabayashi, Kokubunji, both of Japan

[73] Assignee: The Yokohama Rubber Co., Ltd., Tokyo, Japan

[21] Appl. No.: 739,336

[22] Filed: May 30, 1985

[30] Foreign Application Priority Data

Jun. 30, 1984 [JP] Japan .................. 59-135851

[51] Int. Cl.$^4$ .............................................. E02B 3/22
[52] U.S. Cl. .................................. 405/215; 267/140.3
[58] Field of Search ............... 405/212, 215; 267/140, 267/140.3, 141, 152, 153; 114/219

[56] References Cited

U.S. PATENT DOCUMENTS

| 3,610,610 | 10/1971 | Chassagne | 267/152 |
| 3,892,398 | 7/1975 | Marsh | 267/153 |
| 4,258,641 | 3/1981 | Wakamiya | 405/215 X |
| 4,515,502 | 5/1985 | Kajigaya et al. | 405/215 |

Primary Examiner—David H. Corbin
Attorney, Agent, or Firm—Armstrong, Nikaido, Marmelstein & Kubovcik

[57] ABSTRACT

A buckling fender comprising a cylindrical body molded from at least two rubber-like elastic materials differing in modulus of elasticity. At least two rubber-like elastic materials are combined such that the apparent modulus of elasticity at the central part of the cylindrical body in its axial direction becomes lower than that at both end portions.

10 Claims, 4 Drawing Figures

BUCKLING FENDER

BACKGROUND OF THE INVENTION

This invention relates to a buckling fender used as an impact buffering means for a ship coming alongside a quay.

Various types of fenders are known. Among them, the so-called buckling fender has a hollow cylindrical body molded from a rubber-like elastic material and is so constructed that an end of the hollow cylindrical body in its axial direction is secured to the quay and an impact-receiving board can be fitted to the other (free) end thereof. In this type of fender, when an impact is given thereto by a ship coming alongside the quay, the hollow cylindrical body is buckled and deformed in the axial direction while producing a reaction force which acts to buffer the impact.

In such buckling type fenders, a considerably large amount of rubber-like elastic material is used for forming the hollow cylindrical body. Therefore, if a reduction of the amount of such rubber-like elastic material required for forming the fender body is realized, it leads to a significant reduction of fender production cost and a reduction of weight that can facilitate the fender installation. However, decrease of thickness of the hollow cylindrical body for attaining a weight reduction poses the problem that the energy absorbing efficiency is accordingly lowered to reduce the buffering performance of the fender or even to make it unserviceable for the purpose.

SUMMARY OF THE INVENTION

An object of this invention is to provide a buckling fender which is light in weight and yet has high energy absorption efficiency.

Another object of this invention is to provide a buckling fender having the same level of energy absorption efficiency of the conventional thick-walled hollow cylindrical buckling fender but thinner than such conventional fender.

In order to accomplish these objects, the buckling fender according to this invention has its hollow cylindrical body composed of at least two rubber-like elastic materials differing in modulus of elasticity, which are combined in such a way that the apparent modulus of elasticity at the central part of the hollow cylindrical body in its axial direction is less than that at both end portions. In the combined structure of such at least two rubber-like elastic materials differing in modulus of elasticity, the materials are laminated in at least two layers at the central part of the hollow cylindrical body in its axial direction.

Further objects of this invention will become apparent as the invention is more fully described below by way of an embodiment thereof in conjunction with the accompanying drawings.

DETAILED DESCRIPTION OF THE INVENTION

Figure 1:
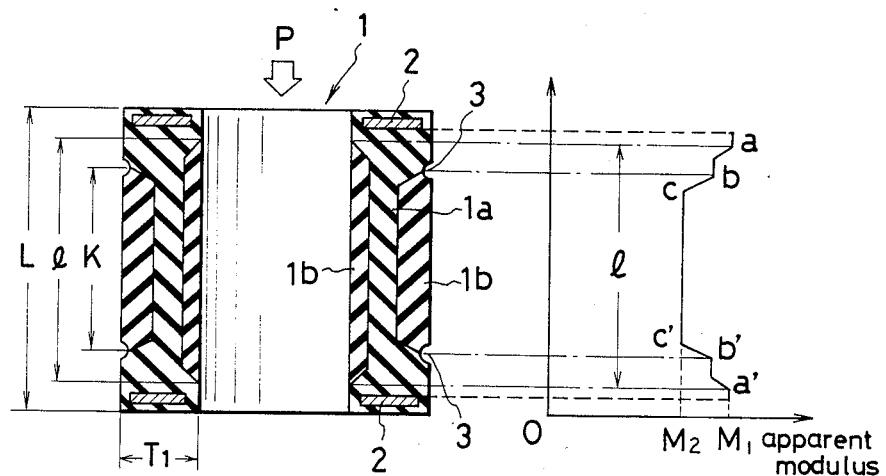
FIG. 1(A) is a sectional view to the axial direction of a buckling fender in accordance with an embodiment of this invention.
FIG. 1(B) is a graph illustrating the change of apparent modulus of elasticity distributed in the axial direction of the fender, the graph being shown in dimensional correspondence to the buckling fender of FIG. 1(A)

Referring to FIG. 1(A), there is shown in longitudinal section to the axial direction of a fender according to this invention having a hollow cylindrical body 1 which is substantially uniform in thickness T1 along its full length in the axial direction and molded integrally from two rubber-like elastic materials 1a, 1b which differ in modulus of elasticity from each other.

The modulus of elasticity Na of one of the rubber-like elastic materials 1a is greater than the modulus of elasticity Nb of the other rubber-like elastic material 1b. Both end portions of the cylindrical body 1 are constituted entirely by the rubber-like elastic material 1 with greater modulus of elasticity Na, but at the central part of the cylindrical body, the layer of the material 1a is reduced in thickness and the rubber-like elastic material 1b with smaller modulus of elasticity Nb is laminated on both inner and outer sides of the layer of the material 1a so as to make up for the reduced thickness of the material 1a. An annular metallic reinforcement 2 is embedded in each of both end portions which are constituted entirely by the rubber-like elastic material 1a. It will also be seen that grooves 3, 3 are formed circumferentially in the outer peripheral surface of the cylindrical body 1 close to both end portions and at the boundaries of both rubber-like elastic materials 1a and 1b.

At one end [lower side in FIG. 1(A)] of the cylindrical body 1, a bottom plate (not shown) is secured through metallic reinforcement 2, the bottom plate being designed to be fitted to the quay. At the other end [under side in FIG. 1(A)] of the cylindrical body 1 is provided an impact receiving plate, not shown, through metallic reinforcement 2. When an impact is imparted from a ship in the direction of an arrow P, the cylindrical body 1 buckles so as to excercise a buffering action. In the fender, buckling takes place substantially symmetrically along the axis with grooves 3, 3 acting as the fulcrum.

In the cylindrical body 1 composed of a combination of the rubber-like elastic material 1a with modulus of elasticity Na and the rubber-like elastic material 1b with smaller modulus of elasticity Nb, the apparent modulus of elasticity differs incrementally in the axial direction as illustrated in FIG. 1(B). That is, the apparent modulus of elasticity is greatest, indicated by M1, at the regions from both ends of cylindrical body 1 to the points a, a′, where the whole thickness of the cylindrical body is constituted by rubber-like elastic material 1a alone. The apparent modulus of elasticity is less in the regions b–c and b′–c′ where both rubber-like elastic materials 1a and 1b exist in layers, and it is least (M2) at the central region c–c′.

Regarding the relation of the apparent moduli of elasticity in the present invention, it is preferred to select them such that the M2/M1 ratio is 0.40 to 0.95, more preferably 0.60 to 0.95 in view of the stress concentration at the interface of both rubber-like elastic materials 1a, 1b. The change of apparent modulus of elasticity is non-uniform in the regions a–c and a′–c′ as shown in FIG. 1(A), but such non-uniformity in a limited range is allowable as far as the above recited relation of M2/M1 is satisfied.

It is most desirable that the two rubber-like elastic materials 1a, 1b are so combined as to constitute a three-layer structure having two interfaces at the central part of the cylindrical body 1 in its axial direction, but they may be arranged to form a two-layer structure having one interface if the above preferred relation of M2/M1 is maintained. It is also possible to constitute four or more layers having three or more interfaces. Further, three or more types of rubber-like elastic material may be combined while maintaining the preferred relation of M2/M1.

By maintaining the relation of M2/M1=0.40 to 0.95, it becomes possible to obtain the same level of energy absorption efficiency as with the conventional thick-walled buckling fender even if the wall thickness T1 of cylindrical body 1 is reduced to the order of from 75/100 to 98/100 of the wall thickness T2 of the conventional fender.

If the M2/M1 ratio is less than 0.40, there takes place no decline of reaction force after it has reached the maximum (peak) when the fender was compressed, and it becomes difficult to obtain the desired efficient energy absorption. If the M2/M1 ratio is greater than 0.95, the apparent modulus of elasticity at the region c–c' comes close to that of the conventional fender, thereby making it difficult to reduce thickness and weight in the present invention.

In order to meet the requirements for M2/M1 ratio, it is advisable to construct cylindrical body 1 such that the ratio of the length l between the points a and a' (from which the maximal apparent modulus of elasticity M1 begins to decrease inwardly) to the axial length L of cylindrical body 1 (l/L ratio) will be 0.15 to 0.90. If the l/L ratio is less than 0.15, those sections where the apparent modulus of elasticity changes are too small in distance to obtain the desired energy absorption efficiency throughout the whole structure although the required energy absorption efficiency can be obtained partially. On the other hand, if the l/L ratio exceeds 0.90, a change of apparent modulus of elasticity takes place near the interface of reinforcement 2 and rubber-like elastic member 1a, causing interfacial separation due to concentration of stress.

Grooves 3, 3 provided circumferentially in both end portions of the cylindrical body 1 serve as a fulcrum for axially symmetrical buckling deformation of the cylindrical body 1 when a compressive force is exerted on the cylindrical body 1 in its axial direction. In order to facilitate such axially symmetrical buckling deformation, both grooves 3, 3 are preferably so positioned that the distance K between the grooves 3, 3 will be 60/100 to 85/100, more preferably 65/100 to 77/100 of the axial length L of cylindrical body 1. If the distance K is smaller than 60/100 of L, axially symmetrical buckling is unlikely to occur. This is because of too narrow spacing. Asymmetric buckling deformation tends to take place instead. Such asymmetric deformation may cause early contact of the inner peripheral surface of the cylindrical body 1 to decrease the energy absorption efficiency or cause a sharp reaction. Conversely, if the distance K is greater than 85/100 of L, the outer peripheral surface of cylindrical body 1 tends to contact the impact receiving board or the quay too early and a sharp reaction is produced when the cylindrical body 1 has received a compressive force.

Various types of rubber material such as natural rubber, SBR, NBR, CR, BR, IR, IIR, EPR, etc. can be used as rubber-like elastic materials 1a, 1b constituting the cylindrical body 1, and such rubber materials may be properly selected and combined so as to satisfy the relation of Na>Nb regarding the modulus of elasticity. Since a rubber material can be varied in modulus of elasticity according to the degree of vulcanization, both rubber-like elastic materials 1a, 1b may be composed of a same rubber material varied in modulus of elasticity in parts.

Figure 2:
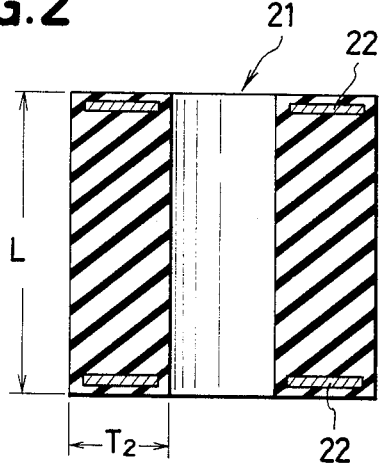
FIG. 2 is a sectional view to the axial direction of a conventional buckling fender.

FIG. 2 illustrates cylindrical body 21 of a conventional buckling fender shown for the purpose of comparison with the fender of this invention.

Cylindrical body 21 is made of a single rubber-like elastic material 21a molded so that the body 21 is substantially uniform in thickness T2 along its full axial length, and annular metallic reinforcements 22, 22 are embedded in both end portions. Thickness T2 of cylindrical body 21 is greater than thickness T1 of the fender of this invention, the difference being such that $T2 \approx (100/75 \text{ to } 100/98) \times T1$.

Figure 3:
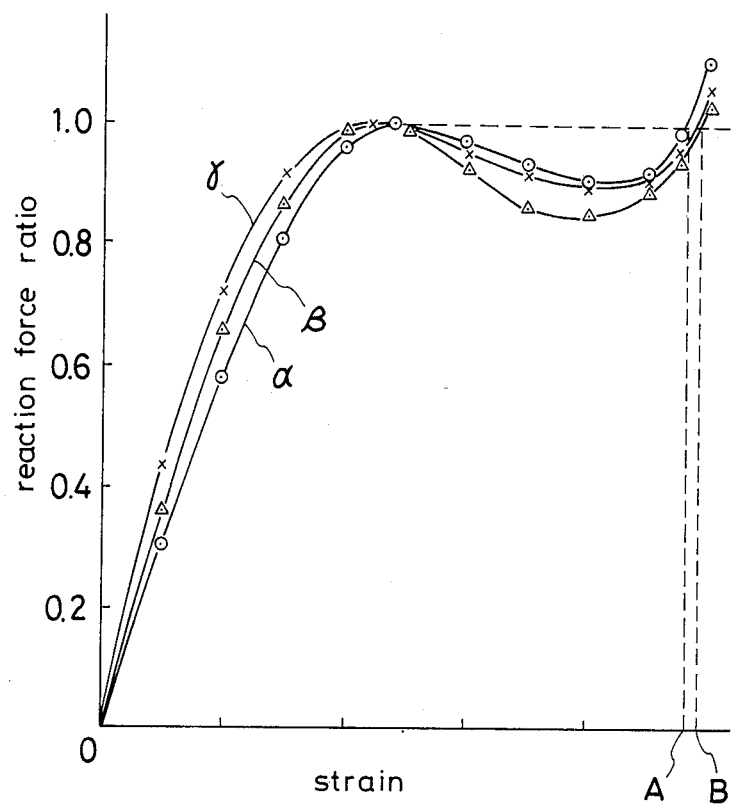
FIG. 3 is a graph showing the relation between strain produced when the fender is compressed in its axial direction and reaction force ratio.

FIG. 3 shows the reaction force ratio characteristic curves showing the relation between strain produced when a compressive force acts on the fender in its axial direction and the reaction force ratio. "The reaction force ratio" is the value obtained by dividing the maximum reaction by the reaction produced at each strain. "Maximum reaction force" referred to herein is the reaction force at the inflection point at which the reaction, which has steadily increased from the origin with the increase of strain, changes to a decreasing mode with further increase of strain, in other words, it means the first peak of reaction force.

In the graph of FIG. 3, the curve $\alpha$ is the reaction ratio characteristic curve of the conventional buckling fender having a cylindrical body 21 with thickness T2 shown in FIG. 2, the curve $\beta$ is the reaction ratio characteristic curve of the conventional buckling fender of which the thickness of cylindrical body 21 has been reduced to T1 which is the same as the fender of the present invention, and the curve $\gamma$ is the reaction ratio characteristic curve of the buckling fender of this invention having cylindrical body 1 with thickness T1 shown in FIG. 1(A).

Curve $\beta$ indicates that because of the reduction of thickness from T2 to T1 in a conventional structure, the energy absorption efficiency is improved in the initial phase [in the period before the reaction force reaches the first peak (maximum reaction)], but after the reaction passes this first peak, the energy absorption efficiency drops sharply in comparison with the curve $\alpha$. A fender with such buffering characteristics could not withstand typical impacts received in practice.

In contrast with this, in the fender of this invention, as indicated by the curve $\gamma$, the initial energy absorption efficiency (in the period till the maximum reaction is reached) stays higher than the curve $\beta$, and after this maximum reaction force has been passed, the energy absorption efficiency follows a substantially same trend as the curve $\alpha$. Further, at the termination of compression, the amount of strain is B in curve $\gamma$ while it is A in curve $\alpha$, which means that in the fender of this invention, it is possible to increase energy absorption efficiency by an amount corresponding to the difference (B−A) in the amount of strain as compared with the conventional fender. Thus, with the buckling fender of this invention, which is thinner and lighter than the conventional fender, it is possible to obtain an energy absorption efficiency comparable to the conventional thick-walled fender, and thereby very excellent buffering characteristics can be obtained.

What is claimed is:

1. A buckling fender comprising a hollow cylindrical body molded from at least two rubber-like elastic materials differing in modulus of elasticity for compression axially of said cylindrical body, said at least two rubber-like elastic materials being laminated to each other in said body so that an apparent modulus of elasticity at a central part of said cylindrical body in said compression axial direction of said body is lower than the apparent modulus of elasticity at both end portions in said compression axial direction.

2. The buckling fender according to claim 1, wherein said at least two rubber-like elastic materials are laminated in a thicknesswise direction at said central part of said cylindrical body in said compression axial direction.

3. The buckling fender according to claim 1, wherein at said central part of said cylindrical body in said compression axial direction, a rubber-like elastic material with a high modulus of elasticity is disposed centrally in said compression axial direction, and another rubber-like elastic material with a lower modulus of elasticity is laminated on opposite outer and inner sides thereof in said compression axial direction.

4. The buckling fender according to claim 1, wherein in an outer peripheral surface of both end portions of said cylindrical body in said compression axial direction, grooves are provided at locations where the high apparent modulus of elasticity material at said end portions joins said lower apparent modulus of elasticity material at said central part of said cylindrical body.

5. The buckling fender according to claim 1, wherein the ratio of said apparent modulus of elasticity at said central part of said cylindrical body in said compression axial direction to said apparent modulus of elasticity at said end portions, is from 0.40 to 0.95.

6. The buckling fender according to claim 5, wherein said apparent modulus ratio is from 0.60 to 0.95.

7. The buckling fender according to claim 5, wherein the ratio of the distance between the points at which said higher apparent modulus of elasticity in both end portions of said cylindrical body in said compression axial direction changes to become lower toward said central part of said cylindrical body to the axial length of said cylindrical body is from 0.15 to 0.90.

8. The buckling fender according to claim 6, wherein the ratio of the distance between the points at which said higher apparent modulus of elasticity in both end portions of said cylindrical body in said compression axial direction changes to become lower toward said central part of said cylindrical body to the axial length of said cylindrical body is 0.15 to 0.90.

9. The buckling fender according to claim 4, wherein the distance between said two grooves is 60/100 to 85/100 of its axial length of said cylindrical body.

10. The buckling fender according to claim 4, wherein the distance between said two grooves is 65/100 to 77/100 of the axial length of said cylindrical body.

* * * * *